H. RUSSELL.
WATER SOFTENING APPARATUS.
APPLICATION FILED MAR. 20, 1908.
958,831.
Patented May 24, 1910.
3 SHEETS—SHEET 1.
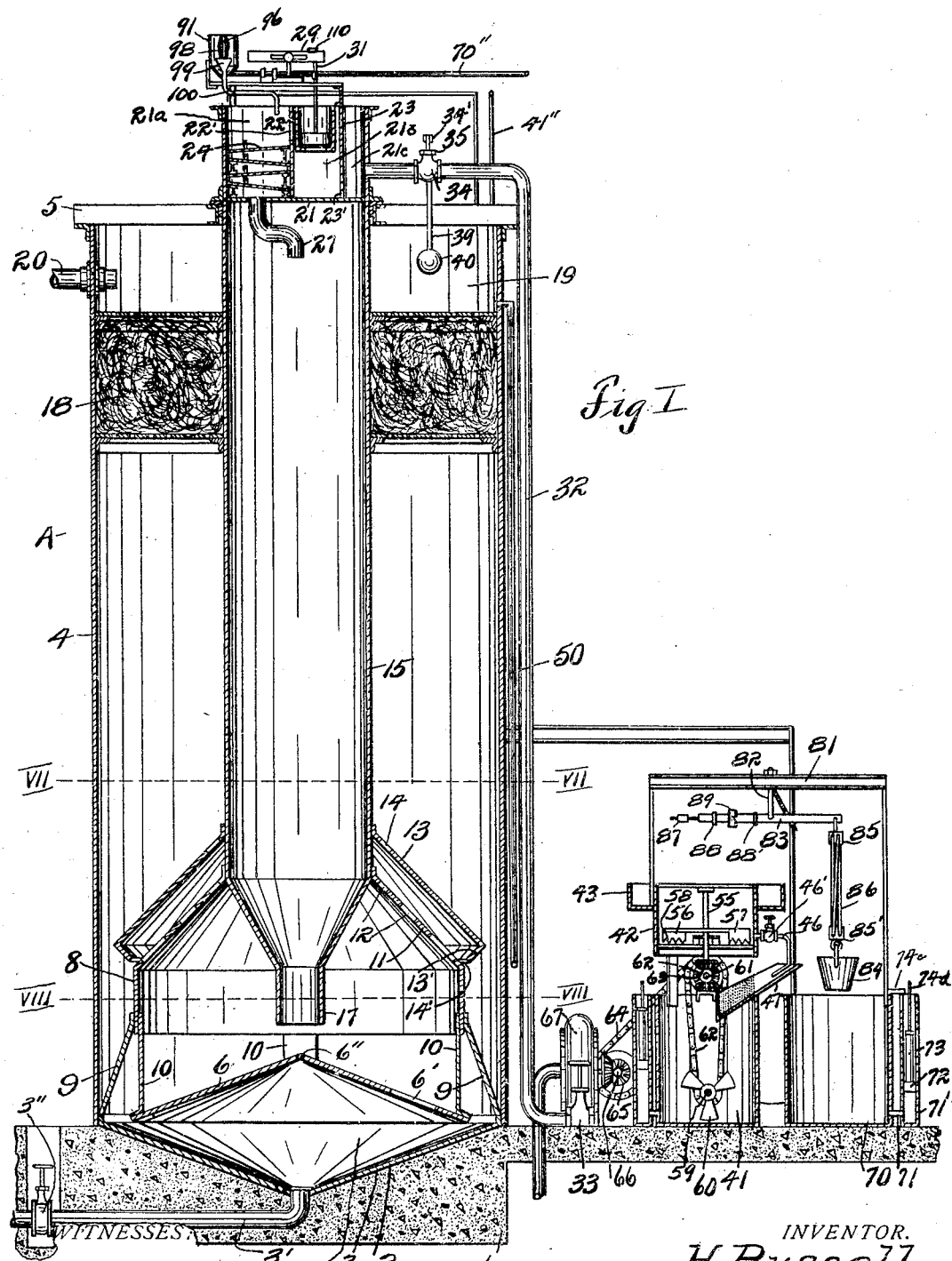
Fig I
WITNESSES:
Harold E. Richards
Helen E. Clabaugh
INVENTOR.
H. Russell
BY Arthur C. Brown
ATTORNEY.

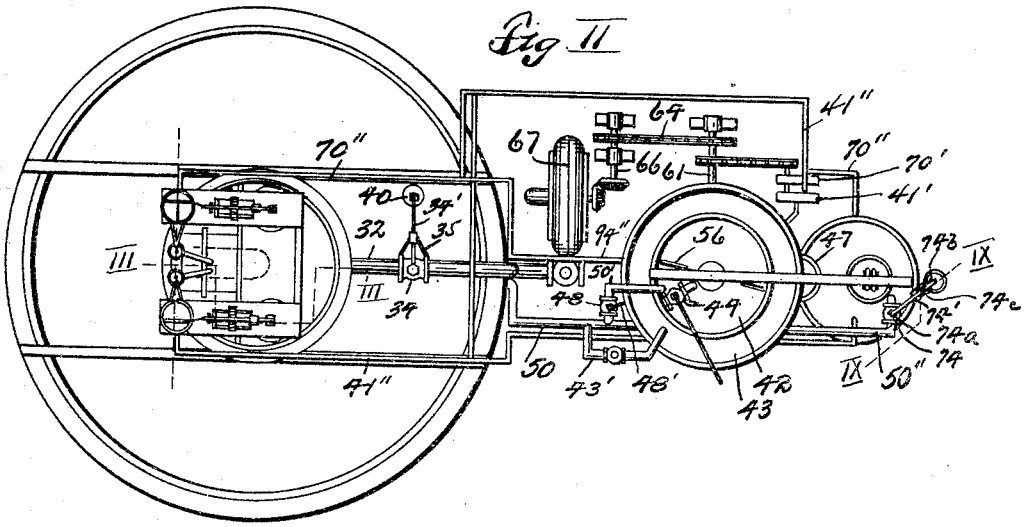
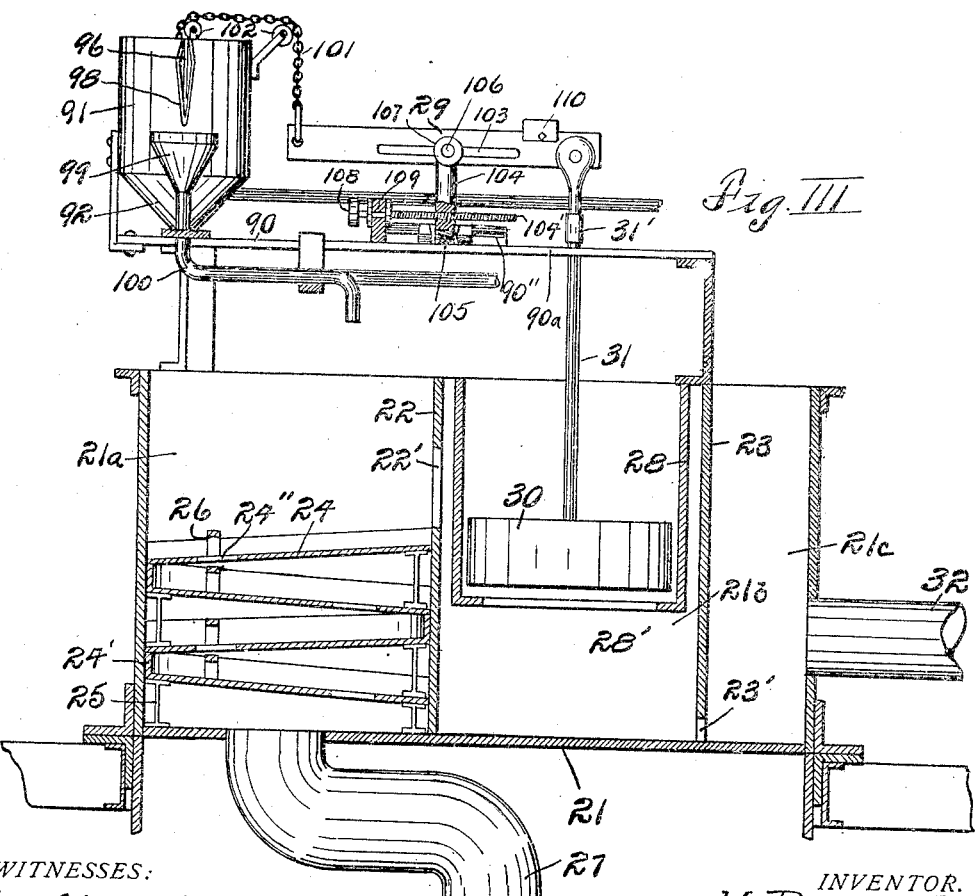

H. RUSSELL.
WATER SOFTENING APPARATUS.
APPLICATION FILED MAR. 20, 1908.
958,831.
Patented May 24, 1910.
3 SHEETS—SHEET 3.
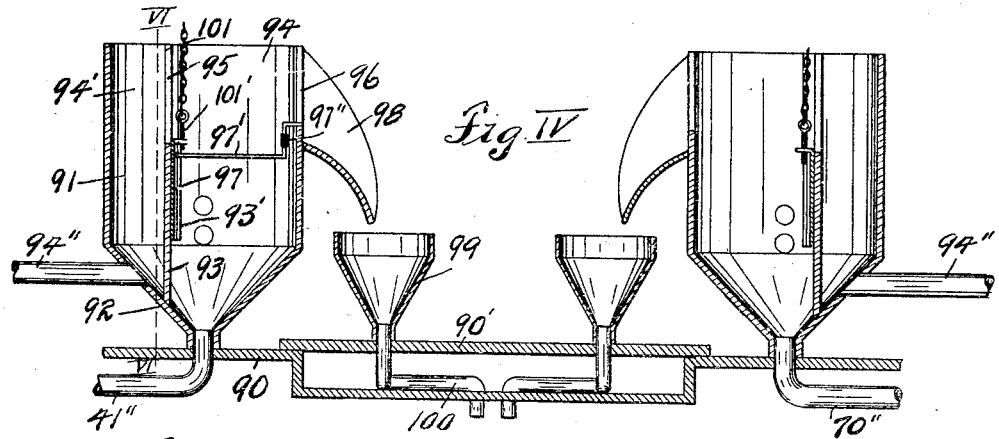
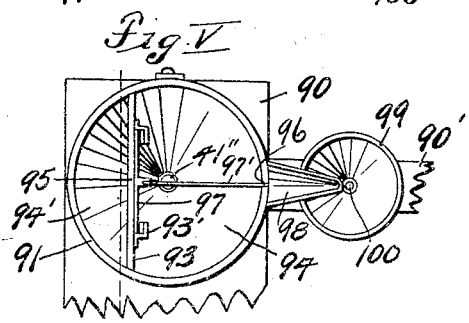
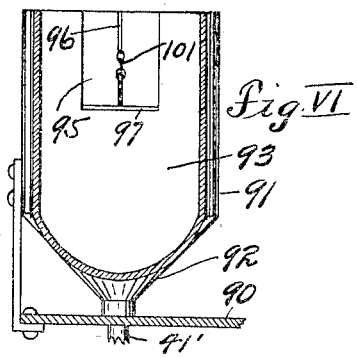
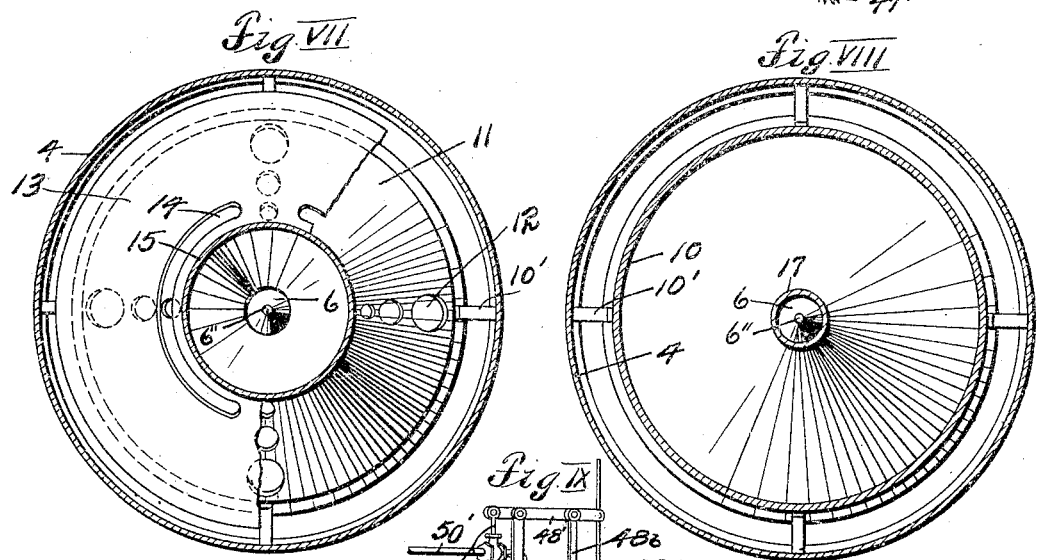
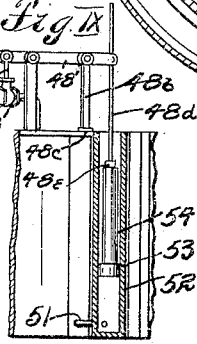
WITNESSES:
Harold E. Richards
Helen E. Clabaugh
INVENTOR.
H. Russell,
BY Arthur C. Brown
ATTORNEY.

UNITED STATES PATENT OFFICE.

HEZEKIAH RUSSELL, OF MARION, OHIO.

WATER-SOFTENING APPARATUS.

958,831.  Specification of Letters Patent.  Patented May 24, 1910.

Application filed March 20, 1908. Serial No. 422,195.

*To all whom it may concern:*

Be it known that I, HEZEKIAH RUSSELL, a subject of the Kingdom of Great Britain, residing at Marion, in the county of Marion and State of Ohio, have invented certain new and useful Improvements in Water-Softening Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a water softening apparatus and more particularly to an apparatus of that class wherein an uninterrupted purifying and softening action may be had upon a volume of water which is continuously passing therethrough.

The softening process which I use is one well known in the art and consists of treating hard water by solutions of suitable chemicals, usually lime and soda ash, in order to precipitate the elements that are carried in and give the water its hardness, in order that such elements may be collected in the bottom of a settling tank and removed therefrom as sludge.

While I have mentioned lime and soda ash solutions as used for the softening process, other well known solutions may be used under certain conditions of water, but as these named are the most commonly used, I will describe my apparatus as adapted merely for the use of these two chemicals although it is equally adapted for others.

It is the object of my invention to provide an apparatus wherein the chemicals may be correctly weighed and conveniently supplied to solution storage tanks and means for supplying the proper amount of water for mixture with such chemicals to form the desired strength of solution, and to properly mix the chemicals and water within the storage tanks.

A further object is to provide means for correctly and automatically proportioning the flow of chemicals to the raw water, irrespective of the amount of raw water entering the softening apparatus to be treated.

A further object is to provide a precipitating and settling tank wherein the precipitates may be separated from the constantly flowing volume of water.

A further object is to provide a filter for collecting the particles which are too light to settle during the main separation.

A further object is to so combine and arrange the parts above mentioned as to form an apparatus that is economical in construction and operation; such an apparatus being fully described in this specification and illustrated in the accompanying drawings in which:—

Figure I is a central vertical section of an apparatus constructed according to my invention. Fig. II is a top plan view of the apparatus. Fig. III is a sectional view on the line III—III, Fig. II. Fig. IV is an enlarged detail view of the solution proportioning tanks, in central vertical section. Fig. V is a top plan view of one of the proportioning tanks. Fig. VI is a sectional view of same on the line VI—VI, Fig. IV. Fig. VII is a sectional view of the settling tank on the line VII—VII, Fig. I. Fig. VIII is a similar view on the line VIII—VIII, Fig. I. Fig. IX is an enlarged detail view in vertical section, of one of the balance arms and float controlling the flow to the solution storage tanks, taken on the relative line IX—IX, Fig. II. Fig. X is a detail view of the scale rod used for regulating the balance rod shown in Fig. IX.

Referring more in detail to the parts:— Supported above the tank bottom by means presently described, and preferably inset from casing 4, is a cone shaped baffle 6, between which and the tank bottom, is formed a chamber 7 for collection of the sludge which passes over the lower edge of cone 6 after precipitation; said cone 6 being provided with a manhole 6', and with an air opening 6'' in its apex.

8 designates a cylinder which is supported from the tank bottom by legs 9, and is set in from the casing 4, and provided with the legs 10 which support the baffle 6. Cylinder 8 has a sloping, hood top 11 attached, at its upper end, to a downtake pipe 15 (presently described) and provided with openings 12. Superposed on hood 11 is a baffle 13 the top of which is preferably parallel with hood 11 and is provided with the slots 14, which are preferably located near the downtake pipe 15, which latter extends upwardly to the top of the precipitating tank "A" formed by the bottom 3 and casing 4; the lower end of said pipe being contracted to a substantial funnel shape and provided with a discharge cylinder 17. Pipe 15 is properly supported from the top of tank "A" and carries the baffle 13 and hood 11. Depending from baffle 13 is a peripheral flange 13' which extends downwardly almost to the top of hood 11 to form a slot 14' through which the sludge collecting on hood 11 may slide and pass to the cone bottom of tank "A". Supported by casing 4 and intake pipe 15 near the top of tank "A" is a filter 18, of fine excelsior or like material, through which the water rises into the purified water chamber 19 from which it may be drawn off through a pipe 20; the parts above described being the main body of my apparatus with which the solution weighing, mixing, and flow controlling parts, which I will now describe, are connected.

Supported over pipe 15 is a tank 21 extending longitudinally through which are the partitions 22 and 23 which divide same into the chambers $21^a$, $21^b$ and $21^c$; partition 23 having an opening 23' through which water may pass from chamber $21^c$ to chamber $21^b$, and partition 22 having a weir 22' through which water may pass from chamber $21^b$ to chamber $21^a$. Located in chamber $21^a$ are the baffles 24 which are successively supported on the tank bottom and on each other by legs 25 and flanges 24', the alternating plates being inclined downwardly in opposite directions, and each provided with openings 24'' and handles 26.

Opening through the bottom of chamber $21^a$ and adapted for discharge into the downtake pipe 15 is a conduit 27. Supported in chamber $21^b$ is a cylinder 28 having a port 28' in its lower end through which water flowing into chamber $21^b$ may rise to contact with a float 30, which is connected with one end of a balance arm 29 the mounting of and parts connected with the opposite end of which are hereafter described.

Opening into chamber $21^c$ is a raw water supply pipe 32 which may lead to any suitable supply source and the flow through which is controlled by a main valve 33 and an auxiliary valve 34, the latter being controlled by a lever 34' which is fulcrumed on a bracket 35 and pivoted to the valve stem, the loose end of said lever having pivotally secured thereto a hanger rod 39 the lower end of which projects into the tank chamber 19 and carries a float 40, the use of which will be presently pointed out.

Seated on foundation 1 are the solution storage tanks here shown to be two in number and adapted for containing lime and soda ash, and as these are the solutions most commonly used I will describe my apparatus in detail as adapted for such use although additional tanks, for use with different solutions may be provided.

41 designates the lime solution storage tank above which is mounted a slaking tank having a water measuring tank 43 supported thereon that is filled through a branch 43' on pipe 50 and is provided with a valve 44 through which the water from said measure may be drawn off into tank 42 when desired.

46 designates a conduit opening into tank 42 slightly above the bottom and adapted to deliver liquid therefrom into a chute 47 the bottom and sides of which within tank 41 are perforated as indicated in Fig. 1, to permit the liquid to drain into said tank while retaining the unslaked portion of the lime or foreign substances, the arrangement shown for feeding the water to the slaking tank being provided in order that the proper amount of water for the slaking process may be provided to obviate the danger of supplying too much water, which will cause the slaking lime to boil over the top of the tank, or too small a supply which will cause the lime to burn and diminish its value for water softening purposes. Before the slaked lime solution has been drawn off to tank 41, the lever 48' of valve 48 is depressed to permit a flow of water through branch 50' of pipe 50, which leads from the bottom of the purified water chamber 19, into the slaking tank 42 which will flush all the slaked lime off through conduit 46 to tank 41; the valve 48 remaining open to allow tank 41 to fill to a required depth to make the proper lime solution.

Exterior to but connected with tank 41 by a conduit 51 is a float cylinder 52 within which is located a piston float 53 having an upwardly projecting guide cylinder 54 of any determined length, but preferably corresponding in length to the height through which one charge of solution will raise the level in tank 41.

Valve 48 is provided with a stem $48^a$ to which is secured the lever 48' to which is pivotally connected a leg $48^b$ which is adapted to seat on a plate $48^c$ on tank 41 and cylinder 52 and retain said stem in a horizontal position and valve 48 closed. Adapted for adjustment on the outer end of lever 48' is a measuring rod $48^d$ which is adapted to depend into the float cylinder 52 and guide 54; said rod being provided with a scale whereby the feed of water to tank 42 may be regulated to provide a desired depth of solution in tank 41.

Revolubly mounted in tank 42 is a shaft 55 upon which are mounted the horizontal arms 56 which carry the blades 57, said blades being provided with teeth 58 by means of which the heavy slaked lime is stirred within tank 42 to aid in the mixing process.

Revolubly mounted in tank 41 is a shaft 59 on which are mounted the stirrer blades 60 which are adapted to maintain an agitation in the tank 41 for the purpose of preventing the lime, which is not soluble in the water, from settling; shaft 59 being connected with a drive shaft 61 by means of a belt 62 and the shaft 55 being connected with shaft 61 by means of a miter gear and pinions 62 and 63, said shaft 61 being operated by a belt 64 which is run over a sprocket wheel 65 on a drive shaft 66 that is operated by a motor 67, or any suitable power.

Located adjacent to tank 41 is a tank 70 for the storage of soda ash solution, and connected with said tank 70 by a conduit 71 is a float cylinder within which is a piston float 72 having an upwardly projecting guide cylinder 73; and on a branch 50'' of pipe 50 is a valve 74 having its stem 74$^a$ connected with a lever 74' that is provided with a measuring rod 74$^d$; said lever being provided with the pivoted leg 74$^b$ that is adapted to rest on a plate 74$^c$ on tank 70 and cylinder 71'; such parts being similar in construction and operation to the float cylinder and valve connecting parts described in reference to tank 41.

Supported above the solution storage tanks is a beam 81 having a depending bracket 82 upon which is pivoted a balance arm 83 from one end of which is suspended a weighing receptacle 84, said receptacle being preferably connected with the balance arm by means of the pulleys 85, 85' and rope 86 so that the receptacle 84 may be raised to conveniently deliver to either tank 70 or the slaking tank 42, without splashing in either tank. On the end of balance arm 83, opposite that which carries the weighing receptacle is a balance regulator 87 and between said regulator and the rod 82 are the movable weight stops 88, 88' which are provided with means, preferably set screws, for firmly securing same in a desired position on arm 83, in order that the same amount of chemicals may be weighed for each solution prepared. Slidably mounted on said arm between stops 88, 88' is a weight 89 which may be freely moved into contact with either of said stops for a purpose presently set forth.

Supported above tank 21 is the part of the apparatus for regulating and proportioning the flow of chemical solution to the mixing chamber 21$^a$ of tank 21, and as such parts are in duplicate, one for the lime and one for the soda ash solution, but one set will be described in detail with the understanding that the description relates equally to both except in the features specifically mentioned.

Supported on a frame 90 above tank 21 is a tank 91 preferably having the conical bottom 92 and provided with a partition 93 which divides same into the chambers 94 and 94', such partition having a weir 95 as indicated, through which overflow from chamber 94 may pass into chamber 94', a slide frame 93', and a weir gate 97 adapted to slide up and down to cover and uncover said weir in a manner readily apparent. In the side of chamber 94 opposite weir 95 is a vertical weir 96 formed by slotting the tank casing, the bottom of weir 96 being slightly above the bottom of weir 95 so that while no raw water is being treated, the solution pumped into chamber 94 will pass through weir 95 and return to the storage tank through pipe 94''. Supported by tank 91 in position to catch the flow through weir 96 is a trough 98 which is adapted to deliver liquid into a funnel 99 which is connected with a pipe 100 which empties into the chamber 21$^a$ of tank 21, the funnels 99 and pipes 100 being mounted on a bar 90' which may be loosened and turned on one end in order that the parts may be swung out of the way when it is desired to remove the baffle plates 24 from tank 21$^a$, for cleaning or any other purpose.

Having a threaded connection with the upper end of gate 97 is an eye bolt 101' to which is secured a chain 101 which is run over pulleys 102, preferably carried on tank 91, and connected with the free end of the balance rod 29 which has previously been mentioned; the gate 97 having a sufficiently loose seat in its guide 96 to enable the gate to slide up and down upon the movement of said balance rod to raise or lower the level of the chemical solution in tank 91, and the gate 97 being adapted for vertical adjustment independent of the balance arm by raising or lowering arm on bolt 101, through the threaded connection therebetween.

While rod 29 may be fulcrumed in any suitable manner, I prefer to provide same with a slot 103 through which and through the yoke arms 104 of a bracket 105 a rod 106 may project, such rod having the thumb nuts 107 by means of which the parts may be locked together. At its lower end the yoke 104 is secured to a base 105 that is adapted to slide in a frame 90'' carried on frame 90, and for actuation by a screw 104' which has a threaded connection with yoke 104 with a hand wheel 108 which abuts against and is carried by a bracket 109 on base 90'', said balance arm being provided with a balance weight 110 by means of which the bar may be balanced when moved off of its center to proportion the flow of solution to the flow of raw water entering the apparatus, as will presently be set forth, and the float rod 31 being preferably provided with a turn nut 31' by means of which said rod may be shortened or lengthened if desired.

Before using the apparatus the water to be treated is analyzed to determine the strength and nature of the chemicals necessary in the softening process. Presuming the chemicals required to be lime and soda ash, I will first describe the manner of preparing the lime solution.

The measuring rod shown in Fig. X is inserted into float cylinder 52 till it rests on top of guide 54, to determine the distance the top of the guide 54 is from the top of the float cylinder 52, the rod $48^d$ is then adjusted on the lever arm 48' to the same measurement as recorded by the measuring rod, in such position that the float 53 will abut against a disk $48^e$ on the lower end of the rod $48^d$, when the solution has raised the float to the required height, thereby closing the valve 48 and shutting off the flow to tank 42 and insuring a supply of the same amount of water at each renewal; this method allowing the float to rise through a height equal to the length of guide 54 at each renewal irrespective of the amount of solution in the tank 41 at the time of taking the measurement. The weight 89 on the free end of balance arm 83 is moved outwardly to contact with the weight stop 88, which has been adjusted for weighing the proper quantity of lime, and the bucket 84 is filled until the arm is balanced and then emptied into tank 42. The tank 43 is then filled to the overflowing point when its supply is shut off and valve 44 opened to permit the water to flow over the lime in tank 42. When the lime is thoroughly slaked, the valve 48 is opened to permit a flow of water to tank 42 and the valve 46' is opened to permit the solution to flow into tank 41, strainer 47 retaining any unslaked lime or other material which should not be allowed in the prepared solution. The water continuing to flow into tank 42 and thence into tank 41, raises the level of the solution in the float cylinder 52 accordingly, until the float 53 contacts with the disk $48^e$ on the lower end of measuring rod $48^d$, when a continued rise of the float will cause the valve to close until the flow of water to tank 42 is completely shut off, when the leg $48^b$ will have swung to its perpendicular position and seat on plate $48^c$, where it will hold the valve 48 closed, when the solution is pumped from tank 41 to the chemical feed regulating tank 91 and the float 53 lowered in its cylinder. The soda ash is weighed in the same bucket as the unslaked lime, but with the balance weight shifted to contact with the stop 88', which has been set in a perpendicular position and the contents of the bucket emptied directly into the tank 70, into which the water is measured and from which the solution is pumped as described in reference to the lime solution. The pumps 41' and 70', being connected with tanks 41 and 70 near their bottoms, have gravity feed and a discharge through pipes 41'' and 70'', into tanks 91, so that the solutions may flow through weirs 95 into chambers 94' in the respective proportioning tanks, and be returned to the tanks 41 and 70 through pipes 94'' so that no solution may pass through weirs 96 when no water is entering the apparatus. As the proportioning tanks are similar to each other, but one will be hereafter mentioned, although such mention relates equally to both, except in the features pointed out. When the raw water is turned into chamber $21^c$ of tank 21 it passes through the opening in partition 23 and rising in chamber $21^b$ raises float 30, which latter moves the balance rod 29 to lower the end of said rod to which the chain 101 is attached, thereby elevating gate 97. When gate 97 is raised the level of the chemical is correspondingly raised in tank 91 thus causing the correct amount of solution to pass through weir 96; the rod 97' being raised and lowered in weir 96 by the movement of gate 97, to keep the opening free from clogging by particles of lime; rod 97' being provided with a vertical portion then is divided and connected by a turn-nut 97'' by means of which the portion of said rod then projecting into weir 96 may be adjusted vertically. After passing through weir 96, the solution is caught in the funnel 99, and conducted through pipe 100 to the mixing chamber $21^a$ where it mingles with the raw water flowing through weir 22'. Should I desire an increased or decreased amount of chemical for the same volume of raw water to be treated under changing conditions of hardness, without changing the original strength of the solution in tank 41, I slide the balance arm fulcrum to lengthen or shorten the leverage controlling gate 97 so that said gate may have increased or decreased vertical travel thus influencing the level of the chemical exposed to vertical weir 96.

While I have specifically described the treatment of the lime solution, the soda ash solution is treated in the same way and both the lime and soda ash solutions delivered to the same mixing chamber $21^a$.

The water and chemicals being thoroughly mixed by being passed through the baffle plates 24, and the chemical reaction completed, I have now to remove the precipitates from the flowing water which has passed through conduit 27 into the down-take pipe 15. The object now is to keep the flowing water as still as possible, to enable the precipitates to coagulate and settle. The precipitates are carried with the down-flow of water toward the contracted lower end of the down-take pipe 15. This contracts the down flowing water and precipitates into a smaller area and necessarily brings the precipitates closer together giving them a better chance to coagulate, to become heavy and fall on the conical baffle 6 and slide onto the cone-bottom 3 of the main settling tank "A." The baffle 6 is provided that when the valve 3″ is open, to remove the accumulated sludge, the suction from pipe 3′ will not draw water from the downtake pipe 15, but the accumulated sludge from the cone bottom 3. By this means the minimum of water is used in cleaning the system, as it carries out the sludge instead of water. After the sludge is once caught under baffle 6, it is protected from any further agitation from the water flowing from the downtake pipe 15. At the apex of baffle 6 there is a small hole 6″, which, when the apparatus is first filled with water, allows the air to escape from under cone 6, which otherwise would become compressed and as the valve 3″ on pipe 3′ was opened, would cause the air to discharge the water under baffle 6 instead of removing the sludge from the cone bottom 3. As soon as the water has passed out of downtake pipe 15, the heavier precipitates settle on the cone bottom 3 and those of lighter weight remain suspended in the water. The object now is to bring these light precipitates together and combine them and make them heavy, so they will settle from out of the water. This is done by providing baffle 11 and hood 13. The water, after passing from downtake pipe 15, will rise and spread out under baffle 11. Its logical passage now is through the holes 12. As the water and remaining precipitates flow through these holes, the area for the flowing water is condensed to the minimum, so that the precipitates are being brought into close contact, will become heavy and settle on the top of baffle 11, and slide off through opening 14′ and find their way to cone bottom 3. By forcing the water to flow through the holes 12, a greater velocity is given to the water which would cause currents in the space between casing 4 and downtake pipe 15 and carry the now combined precipitates upward. To overcome this, hood 13 is provided, against which the streams of water strike and break. The water then flows out of openings 14 and spreads out to the full capacity of tank "A." There may be a few remaining light particles now in the water which would be removed by filter 18. After the water has passed through this filter it is absolutely softened and clarified.

Having thus described my invention, what I claim as new therein and desire to secure by Letters Patent is:—

1. In a water softening apparatus, the combination of a precipitation tank, a mixing tank having a discharge conduit leading to said precipitation tank, a solution proportioning tank provided with a feed port adapted for discharge into said mixing tank, and with an overflow port, means for closing said overflow port to induce a flow through said feed port, means for delivering liquid to said mixing tank, and means for automatically controlling the overflow port closure to induce a flow through the feed port proportionate to the delivery of liquid to said mixing tank.

2. In a water softening apparatus, the combination of a precipitation tank, a solution tank having a partition dividing same to form a storage chamber and an overflow chamber, said partition being provided with an overflow weir and the tank body with a feed weir opening from said storage chamber, a gate adapted for movement over said overflow weir, a mixing tank having a raw water intake and adapted for receiving solution from the solution tank and for delivering liquid to said precipitation tank, a balance arm, a float located in said mixing tank and connected with one end of said balance arm, and means connecting the opposite end of said arm with said weir gate, for the purpose set forth.

3. In a water softening apparatus, the combination with a precipitation tank, of a mixing tank, a solution proportioning tank having a partition dividing same to form a storage chamber and an overflow chamber, said partition being provided with an overflow weir and the tank side with a vertical weir slot, the latter adapted for discharge into said mixing chamber and having its bottom located at a higher level than the bottom of said overflow weir, a gate adapted to slide over said overflow weir, a cleaning rod carried by said gate and projecting into said weir slot, a conduit for conducting solution from said feed weir to said mixing tank, a balance arm, a float in said mixing chamber and connected with one end of said balance arm, means for connecting the opposite end of said arm with said weir gate, and a conduit for delivering liquid from said mixing chamber to said precipitation tank.

4. In a water softening apparatus, a precipitation tank, a mixing tank, means for delivering liquid to said mixing tank, a solution proportioning tank having an overflow port and provided with a discharge port opening to said mixing tank, means for delivering solution to said proportioning tank, means for varying the level of said overflow port to produce a flow through said discharge port proportionate to the delivery of liquid to said mixing chamber, and means for delivering liquid from said mixing tank to said precipitation tank.

In testimony whereof I affix my signature in presence of two witnesses.

HEZEKIAH RUSSELL.

Witnesses:
E. E. CARPENTER,
HAROLD E. RICHARDS.